3,149,674
FRACTURING OF SUBSURFACE EARTH
FORMATIONS
Henry G. Schutze, Baytown, Tex., Gene D. Thompson, New Orleans, La., and Herbert W. H. Meyer, Jr., Baytown, and Benjamin F. Pennington, Woodsboro, Tex., assignors, by direct and mesne assignments, to Jersey Production Research Company, Tulsa, Okla., a corporation of Delaware
No Drawing. Filed Aug. 23, 1961, Ser. No. 133,328
17 Claims. (Cl. 166—42)

The present invention is directed to hydraulic fracturing. More particularly, the invention is concerned with hydraulic fracturing of subsurface earth formations employing a propping agent. In its more specific aspects, the invention is concerned with a hydraulic fracturing operation employing a fracturing agent which has sustained load-carrying characteristics.

The present invention may be briefly described as a method for fracturing a subsurface earth formation penetrated by a well in which a formation pierced by the well is fractured and then there is introduced into the formation particles of a composition comprising from about 2 to about 8 parts by weight of aggregate per part by weight of a solid thermoplastic polymer such as polyolefin. Preferably about 4 to about 8 parts of aggregate per part of polymer are employed. The particles are deposited in the fractures to maintain them open for subsequent flow of fluid, such as production of hydrocarbons from the fractured formation.

The solid polyolefins employed in the present invention are polymers of olefins having 2 to 8 carbon atoms in the molecule and may suitably be exemplified by polyethylene, polypropylene, ethylene-propylene copolymers, ethylene-butene-1 copolymers, ethylene-pentene-1 copolymers, and the like, having molecular weights in the range from about 10,000 to about 1,000,000. These polymers are produced by polymerization of the corresponding olefins employing the Ziegler type polymerization catalyst which is obtained by at least partially reducing in solution in a diluent a halide of an amphoteric metal selected from Groups IVB, VB, VIB, and VIII of the Periodic System of Elements (see, for example, the Henry D. Hubbard Periodic Chart of the Elements, 1947 Ed. revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer employed in accordance with the present invention, an amphoteric metal halide is reduced in solution in a nonreactive, nonpolar organic diluent in any suitable manner such as by means for chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and at least partially reduced amphoteric metal halide, is employed as the medium in which olefin polymerization is effected.

The diluent to be employed should be non-reactive, nonpolar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.), gas oil distillate fractions obtained from the catalytic cracking of virgin gas oil feed stocks, Diesel oil, etc. It will be understood that, if desired, mixtures of two or more compatible, miscible diluents may be employed. The diluent should be substantially completely free from oxygen, water, and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about $-60°$ to about $400°$ F., preferably at about room temperature. Higher temperatures may be employed, but are generally undesirable in that catalyst decomposition may be encountered. Subatmospheric pressures and pressures up to about 250 atmospheres may be employed in forming the polymer employed in accordance with the present invention. It is generally preferable to employ in the polymerization technique a comparatively low pressure, and specifically it is desirable to employ atmospheric pressure. Reaction time of about 60 minutes are usually required, although reaction time may vary within the range of about 10 minutes to about 24 hours.

The olefin polymers of the type described and illustrated herein are produced by a catalyst of the nature described and having molecular weights as recited which are essentially insoluble in the non-polar organic liquid and form a slurry of polymerized olefins therein.

These polymers are suitably quenched by adding an alcohol, such as methyl alcohol, thereto to deactivate any catalyst and thereafter additional amounts of methyl alcohol are added to precipitate insoluble polymers from the resulting slurry. The polymer particles are separated and recovered from the slurry and then may have added thereto suitable antioxidants and/or costabilizers as may be desired. If it is desired to add antioxidants and stabilizers to the polymers, they may be suitably added to the solid polyolefin in a solution of an aromatic hydrocarbon and sprayed over pellets or particles of the polyolefin and the resulting mixture then extruded through a suitable extruding device to form a homogenous mixture.

The additives may be suitably admixed by milling, extrusion, or other suitable mixing to enhance stability of the polyolefin.

The aggregate employed in the practice of the present invention may be sand, finely divided silica, finely divided limestone, finely divided flint, and other mineral substances or aggregates having similar charactertiscs, such as finely divided coke, wood, metals, and the like. The aggregate may have a mesh size within the range from about 2 to about 100 mesh. Preferably, the mesh size is in the range of from about 8 mesh to about 80 mesh.

The particles of the composition may suitably have a particle size within the range from about 3 to about 120 mesh. A particle size which is entirely suitable and may be preferred is in the range from about 10 to about 20 to 60 mesh. The particles of the composition may suitably be shaped such that they are in the form of spherical particles, tubular or cylindrical particles, or the particles may be irregularly shaped as may be desired.

In employing the particles of the composition in fracturing operations, the particles are suitably added to a fracturing liquid which may be a hydrocarbon or may be an aqueous fracturing liquid, such as fresh or salt water. Other fracturing liquid such as oil-in-water emulsions, water-in-oil emulsions, oil-in-acid emulsions, acidic fluids, and the like, may be used. As a general statement, the fracturing liquids, which are known to the art, may be employed in the practice of the present invention and may suitably contain various materials for controlling the viscosity and/or fluid loss thereof. The fracturing liquid may contain particles of the composition in an amount within the range from about 0.10 to about 7.5 pounds of the particles per gallon of liquid, whether it be an oily or an aqueous liquid. It may be desirable under some circumstances to add materials to the liquid vehicle in which the particles are suspended which will maintain the particles as a suspension therein.

In practicing the present invention, a sub-surface earth formation penetrated by a well may have a suspension of the particles comprised of the aggregate and the solid polyolefin introduced as a suspension thereinto under pressure against an exposed formation, following which the pressure on the suspension is increased until the breakdown pressure of the formation is achieved which causes fractures, either vertical or horizontal, to extend out from the well bore. The formation of fractures may be indicated by a drop in pump pressure and/or an increase in pump rate. Upon parting the formation, the carrier fluid containing the propping agent is injected into the extending fracture and, when injection is stopped, the solid particles of the composition maintain the fracture open. Thereafter, the well is placed on production by providing a pressure differential from the formation into the well which is suitably achieved by swabbing or by replacing the liquid vehicle in the well with a lighter liquid vehicle. The fracturing liquid is flushed back into the well ahead of hydrocarbons produced in the well and thus removed therefrom.

The present invention may be practiced by hydraulically fracturing the formation pierced by the well using a fracturing liquid, following which a liquid suspension of the particles of the composition in an aqueous or oily vehicle may be introduced into the well in contact with the fractured formation, following which sufficient pressure is applied to force the suspension into the formation to lodge the particles in the fractures and maintain them open. Thus, the formation may be fractured with a fracturing liquid such as an oily or aqueous vehicle, an acid gel, or an emulsion, and when a fracture is indicated by a drop in pressure, the liquid suspension is immediately forced into the fractured formation under a sufficiently high pressure to maintain the fractures open. In short, the fracturing liquid may be followed by the liquid suspension of the particles of aggregate and polyolefin, although the fracturing may be initially performed with the suspension.

The composition employed in propping the fractures open has unique properties in that the particles thereof do not crush when subjected to the pressures such as existing in fractures in an earth formation in which the particles of the composition are lodged. Heretofore, in fracturing subsurface earth formations, it has been the practice to employ granular materials such as sand, nut shells, nut hulls, as well as metallic spherals, such as aluminum spherals, to prop the fractures open. Sand is a rigid material such that, on reaching its load limit, it shatters completely, leaving virtually no fracture width and also its crushing results in a large quantity of fine particles which reduce greatly the ability of the remaining fracture, if any, to conduct fluid. Nut hulls such as walnut hulls break into particles and also produce fines. Aluminum spheres are expensive and have the further disadvantage of being readily attacked by acid or caustic solutions used in well treating operations. Additionally, aluminum spheres may allow the establishment of a galvanic cell (aluminum-electrolyte-steel). These latter disadvantages are aggravated by high well temperatures. The particles of the composition employed in the present invention deform without crushing, but, on deformation, the area of contact thereof is increased, which is beneficial in maintaining fractures open. The particles are lightweight, which allows large particles to be carried into the fractures readily. Moreover, the particles are attacked by well fluids or acid or caustic.

Other thermoplastic materials besides the polyolefins illustrated may also be used in forming the particles with the aggregate. These materials include, by way of illustration, thermoplastic polymers such as polystyrene, polyvinyl chloride, polyvinylidine dinitrile, poly-2-methyl-butene-1, as well as molding grade nylon and other materials of a similar nature and/or characteristics. These materials are given by way of illustration only and not by way of limitation. Polyolefins, such as polypropylene of the thermoplastic polymers, are to be preferred in making up the composition from which the particles, including aggregate, are formed.

The particles of polyolefin and aggregate, whether used in the form of spherical, cylindrical particles, or irregularly shaped particles, may be easily handled in a wet or dry condition. Thus, the particles may be bagged and transported to the well site and then introduced into fracturing liquid, whether it be an oily or aqueous vehicle. Thus, the particles may be introduced into the pump liquid through a hopper and the pump liquid thus formed into a suspension and then introduced into the well through a tubing or casing-tubing annulus and thence into a subsurface earth formation pierced by the well, either through perforations in the well casing or in an open hole below the casing. Under some circumstances it may be desirable, when the suspension is introduced through the tubing, to confine the area which is to be fractured by employing a packer closing the casing-tubing annulus.

The amount of pressure employed in fracturing operations is well known and is easily determinable from the type of formation and the depth thereof in the well.

In making up the particles employed in the present invention, this may be accomplished by heating the aggregate and the thermoplastic polymer or polyolefin and then mixing the two, such as by milling, extruding, or by tumbling. For example, a low density polyolefin such as polyethylene or polypropylene may be heated to a temperature above its softening point until the polymer has softened to a hot fluid consistency. Thereafter, the aggregate, preferably dried and preheated, is then mixed with the melted polymer until the final composition comprises about 2 to about 8 parts by weight of aggregate per part of the polyolefin, preferably about 4 to about 8 parts by weight of aggregate per part of solid polyolefin. The solid polyolefin coats the aggregate, and the aggregate may be of sufficient size to form particles having a coating of polyolefin such that the mesh size of the coated particles is within the range from about 3 to about 60 mesh.

The present invention is quite advantageous and useful in that it allows extremely hard formations, such as limestone and dolomite structures of West Texas, to be fractured and maintained open employing a composition of solid polyolefin and aggregate in the form of particles which do not crush. Thus, sand grains employed in these operations may be shattered. It has been found that individual sand grains will shatter under 6 to 12 pound load on a single grain. A uniform layer of Ottawa sand will fail between 3000 and 4000 p.s.i.

In relatively soft formations, sand grains used heretofore tend to embed in the soft formation and allow the fractures created by hydraulic fracturing to heal, and thus no channel exists for production of hydrocarbon fluids. Thus, in the practice of the present invention, the composition of aggregate and solid thermoplastic polymer does not shatter in hard formations and, in soft formations, the particles resist embedment by deforming to expose a larger particle area to sustain the load. Thus, less pressure on the formation face is experienced. In both cases, the composition maintains the fractures in an open condition for production of valuable earth fluids such as, but not limited to, oil, gas, hydrocarbons, and the like. While relatively hard and relatively soft formations have been mentioned, the invention is not limited to propping such formations open, but is applicable to all types of earth formations encountered.

The nature and objects of the present invention having been adequately described and illustrated and the best mode thereof set forth, what we wish to claim as new and useful and secure by Letters Patent is:

1. In a method for fracturing a subsurface earth formation in which sufficient hydraulic pressure is exerted on said formation to fracture same, the improvement which comprises introducing into the resulting fractures deformable particles of a composition comprising from about 2 to about 8 parts by weight of finely divided aggregate per part by weight of a solid thermoplastic polymer, said polymer particles deforming without crushing of said aggregate under existing formation breakdown pressure, whereby said fractures are maintained open for flow of fluid therethrough.

2. In a method for fracturing a subsurface earth formation in which sufficient hydraulic pressure is exerted on said formation to fracture same, the improvement which comprises introducing into the resulting fractures deformable particles of a composition comprising from about 2 to about 8 parts by weight of finely divided aggregate per part by weight of a solid polyolefin, said polyolefin particles deforming without crushing of said aggregate under existing formation breakdown pressure, whereby said fractures are maintained open for flow of fluid therethrough.

3. A method in accordance with claim 2 in which the polyolefin is polypropylene.

4. A method in accordance with claim 2 in which the polyolefin is polyethylene.

5. A method in accordance with claim 2 in which the particles have a size within the range from about 3 to about 60 mesh.

6. In a method for fracturing a subsurafce earth formation in which sufficient hydraulic pressure is exerted on said formation to fracture same, the improvement which comprises introducing into the resulting fractures deformable particles of a composition comprising from about 2 to about 8 parts by weight of finely divided aggregate per part by weight of a solid polyolefin, said polyolefin particles deforming without crushing of said aggregate under existing formation breakdown pressure, whereby said fractures are maintained open for flow of fluid therethrough, said particles having a size within the range from about 3 to about 60 mesh, said polyolefin being a polymer of an alpha olefin having from 2 to 8 carbon atoms in the molecule.

7. A method in accordance with claim 6 in which the polymer is polypropylene.

8. In a method for fracturing a subsurface earth formation in which sufficient hydraulic pressure is exerted on said formation to fracture same, the improvement which comprises introducing into the resulting fractures a liquid suspension of deformable particles of a composition comprising from about 2 to about 8 part by weight of finely divided aggregate per part by weight of a solid polyolefin, said polyolefin particles deforming without crushing of said aggregate under existing formation breakdown pressure, whereby said fractures are maintained open for flow of fluid therethrough.

9. A method in accordance with claim 8 in which the liquid is a hydrocarbon.

10. A method in accordance with claim 8 in which the liquid is water.

11. A method in accordance with claim 8 in which the liquid is salt water.

12. A method in accordance with claim 8 in which the suspension contains from about 0.25 to about 7.5 pounds of said composition per gallon of liquid.

13. A method in accordance with claim 8 in which the liquid is an emulsion.

14. A method for fracturing a subsurface earth formation which comprises introducing into said well in contact with said formation a suspension of deformable particles of a composition comprising from about 2 to about 8 parts by weight of finely divided aggregate per part by weight of a solid polyolefin in a fracturing liquid, said polyolefin particles deforming without crushing of said aggregate under existing formation breakdown pressure, applying sufficient pressure to said suspension to fracture said formation whereby said suspension is introduced into said formation to deposit said particles in the resulting fractures and thereby maintain them open.

15. A method in accordance with claim 14 in which the aggregate is sand.

16. A method in accordance with claim 14 in which the aggregate is finely divided silica.

17. A method in accordance with claim 14 in which the aggregate is finely divided limestone.

References Cited in the file of this patent

UNITED STATES PATENTS

| | | |
|---|---|---|
| 2,699,212 | Dismukes | Jan. 11, 1955 |
| 2,838,116 | Clark et al. | June 10, 1958 |
| 2,950,247 | McGuire et al. | Aug. 23, 1960 |
| 2,962,095 | Morse | Nov 29, 1960 |
| 2,965,172 | Da Rosa | Dec. 20, 1960 |
| 3,000,442 | Gambill | Sept. 19, 1961 |
| 3,026,938 | Huitt et al. | Mar. 27, 1962 |